US012736921B2

(12) United States Patent
Miwa et al.

(10) Patent No.: US 12,736,921 B2
(45) Date of Patent: Sep. 15, 2026

(54) DISPLAY DEVICE AND WATCH

(71) Applicant: CASIO COMPUTER CO., LTD., Tokyo (JP)

(72) Inventors: Jun Miwa, Tokyo (JP); Kei Hanzawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 314 days.

(21) Appl. No.: 18/536,512

(22) Filed: Dec. 12, 2023

(65) Prior Publication Data

US 2024/0210895 A1 Jun. 27, 2024

(30) Foreign Application Priority Data

Dec. 22, 2022 (JP) ................................ 2022-205514

(51) Int. Cl.
*G04G 9/12* (2006.01)
*F21V 8/00* (2006.01)
*G02F 1/1335* (2006.01)

(52) U.S. Cl.
CPC ............ *G04G 9/12* (2013.01); *G02B 6/0088* (2013.01); *G02F 1/133531* (2021.01)

(58) Field of Classification Search
CPC ................................................ G02F 1/133531
See application file for complete search history.

(56) References Cited

U.S. PATENT DOCUMENTS

2001/0022571 A1* 9/2001 Nakano ............... G09G 3/3688 345/98
2010/0066957 A1 3/2010 Miyazaki et al.
2010/0246213 A1 9/2010 Naijo
2013/0044277 A1 2/2013 Momose et al.
2014/0176846 A1 6/2014 Yu et al.
2015/0009783 A1* 1/2015 Hanzawa ............ G02B 6/0061 362/613
2015/0185540 A1 7/2015 Ozeki et al.
(Continued)

FOREIGN PATENT DOCUMENTS

CN 109765722 A 5/2019
JP H0862426 A 3/1996
JP 2002148373 A 5/2002
(Continued)

OTHER PUBLICATIONS

Notice of Reasons for Refusal dated Oct. 15, 2024 received in Japanese Patent Application No. 2022-205514.

*Primary Examiner* — Edmond C Lau
(74) *Attorney, Agent, or Firm* — Scully, Scott, Murphy & Presser, P.C.

(57) ABSTRACT

A display device includes: a circuit board on which a plurality of electronic components are arranged; a light guide plate arranged to face the plurality of electronic components; a display portion arranged on an opposite side to the circuit board of the light guide plate in such a manner as to face the light guide plate; a light-transmitting plate having light transmissivity, arranged between the light guide plate and the display portion, and configured to be in contact with a front surface of the light guide plate and a back surface of the display portion; and a spacer provided on a front surface of the circuit board and configured to regulate a distance between the circuit board and the light guide plate.

10 Claims, 5 Drawing Sheets

(56) References Cited

U.S. PATENT DOCUMENTS

2020/0026135 A1* 1/2020 Ki .................... G02F 1/133528

FOREIGN PATENT DOCUMENTS

| | | | |
|---|---|---|---|
| JP | 2007240810 | A | 9/2007 |
| JP | WO2008072599 | A1 | 3/2010 |
| JP | 2013041759 | A | 2/2013 |
| JP | 2015046383 | A | 3/2015 |
| JP | WO2017061326 | A1 | 8/2018 |
| WO | 2009038069 | A1 | 3/2009 |

* cited by examiner

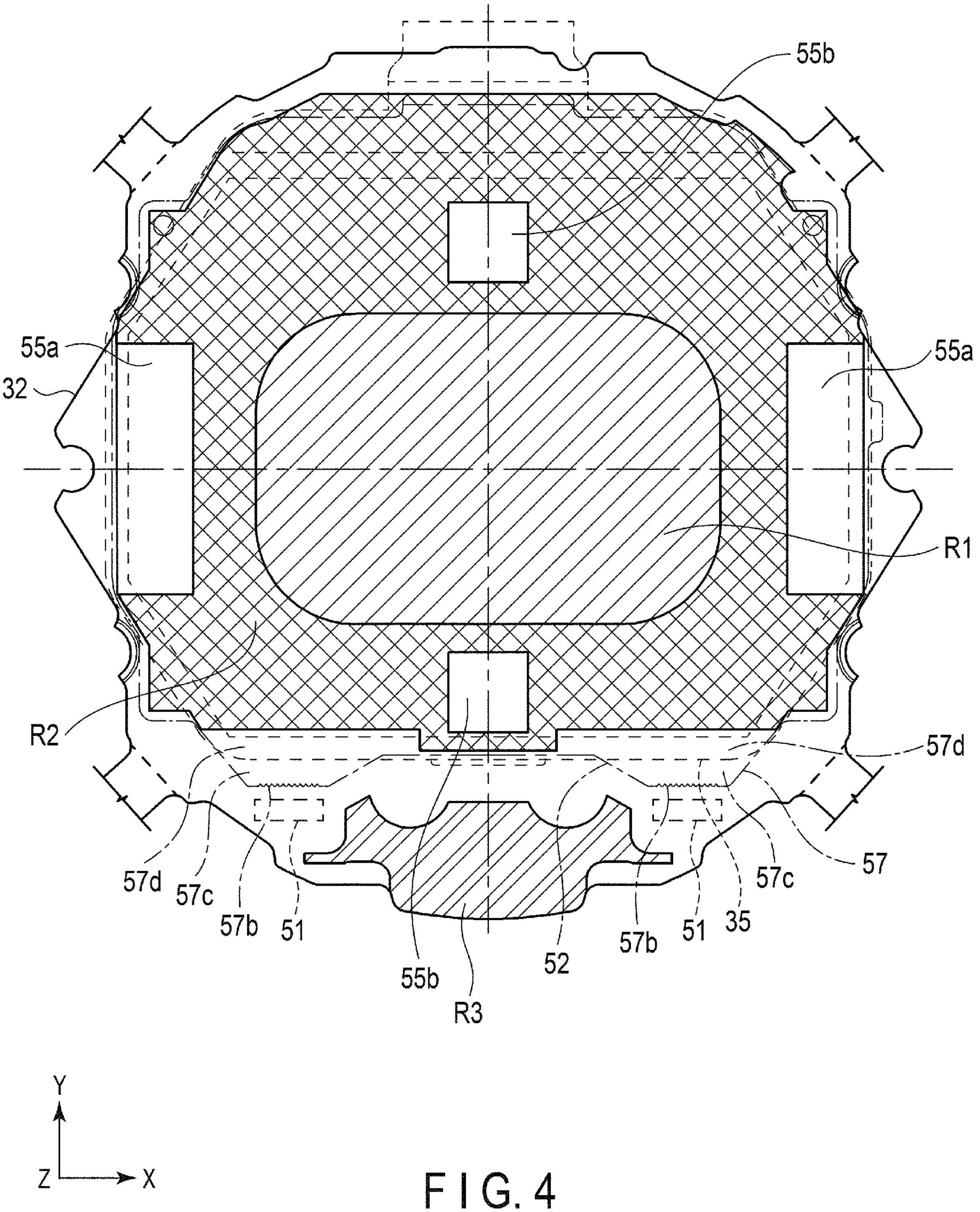
F I G. 4

DISPLAY DEVICE AND WATCH

CROSS-REFERENCE TO RELATED APPLICATIONS

This application is based upon and claims the benefit of priority from Japanese Patent Application No. 2022-205514, filed Dec. 22, 2022, the entire contents of which are incorporated herein by reference.

FIELD

The present invention relates generally to a display device and a watch.

BACKGROUND

Conventionally, as a display device for use in a wristwatch, etc., there exists a display device in which an LCD, a light guide plate, and a reflection plate are stacked in order, and are arranged to face a circuit board on which various electronic components are mounted.

SUMMARY

A display device according to an embodiment of the present invention includes: a circuit board on which a plurality of electronic components are arranged; a light guide plate arranged to face the plurality of electronic component; a display portion arranged on an opposite side to the circuit board of the light guide plate in such a manner as to face the light guide plate; a light-transmitting plate having light transmissivity, arranged between the light guide plate and the display portion, and configured to be in contact with a front surface of the light guide plate and a back surface of the display portion; and a spacer provided on a front surface of the circuit board and configured to regulate a distance between the circuit board and the light guide plate.

BRIEF DESCRIPTION OF THE DRAWINGS

FIG. 4 is a plan view of a circuit board of the watch.

DETAILED DESCRIPTION

Figure 1:
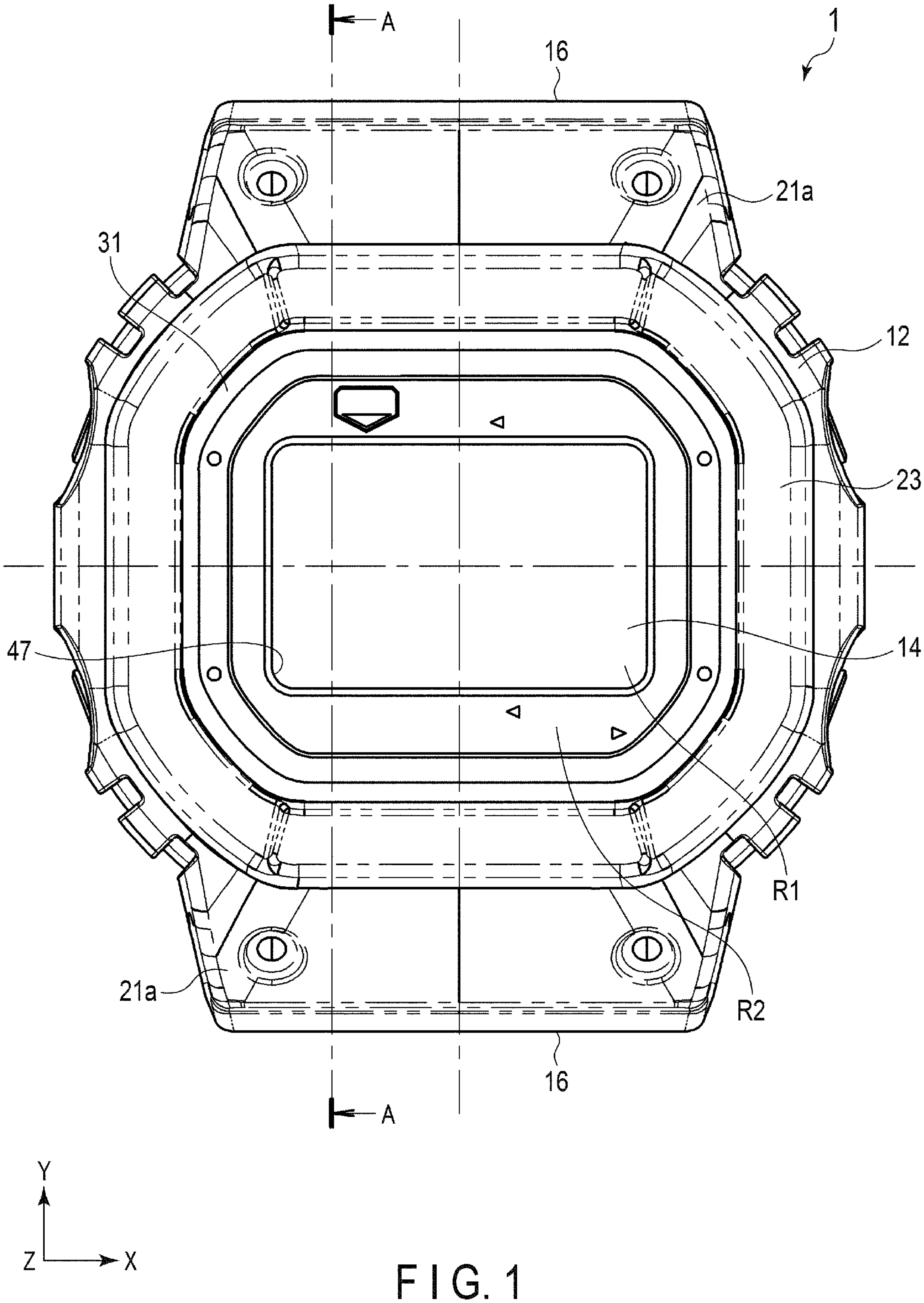
FIG. 1 is a plan view of a watch according to a first embodiment.
Figure 2:
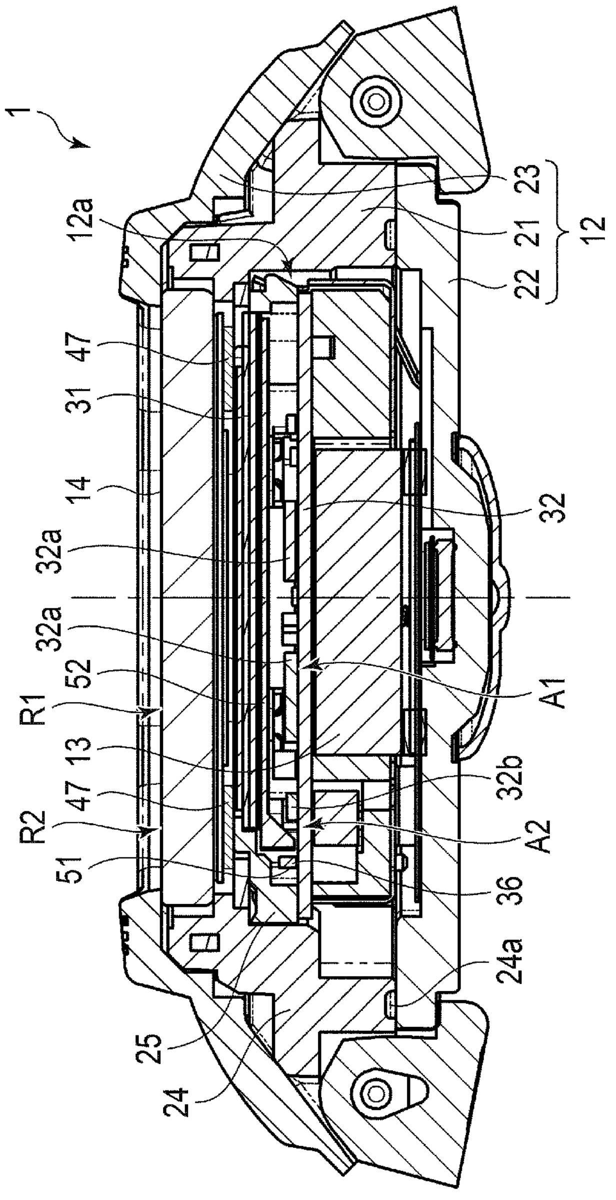
FIG. 2 is a sectional view of the watch.
Figure 2:
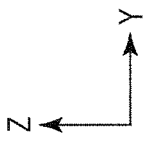
Figure 3:
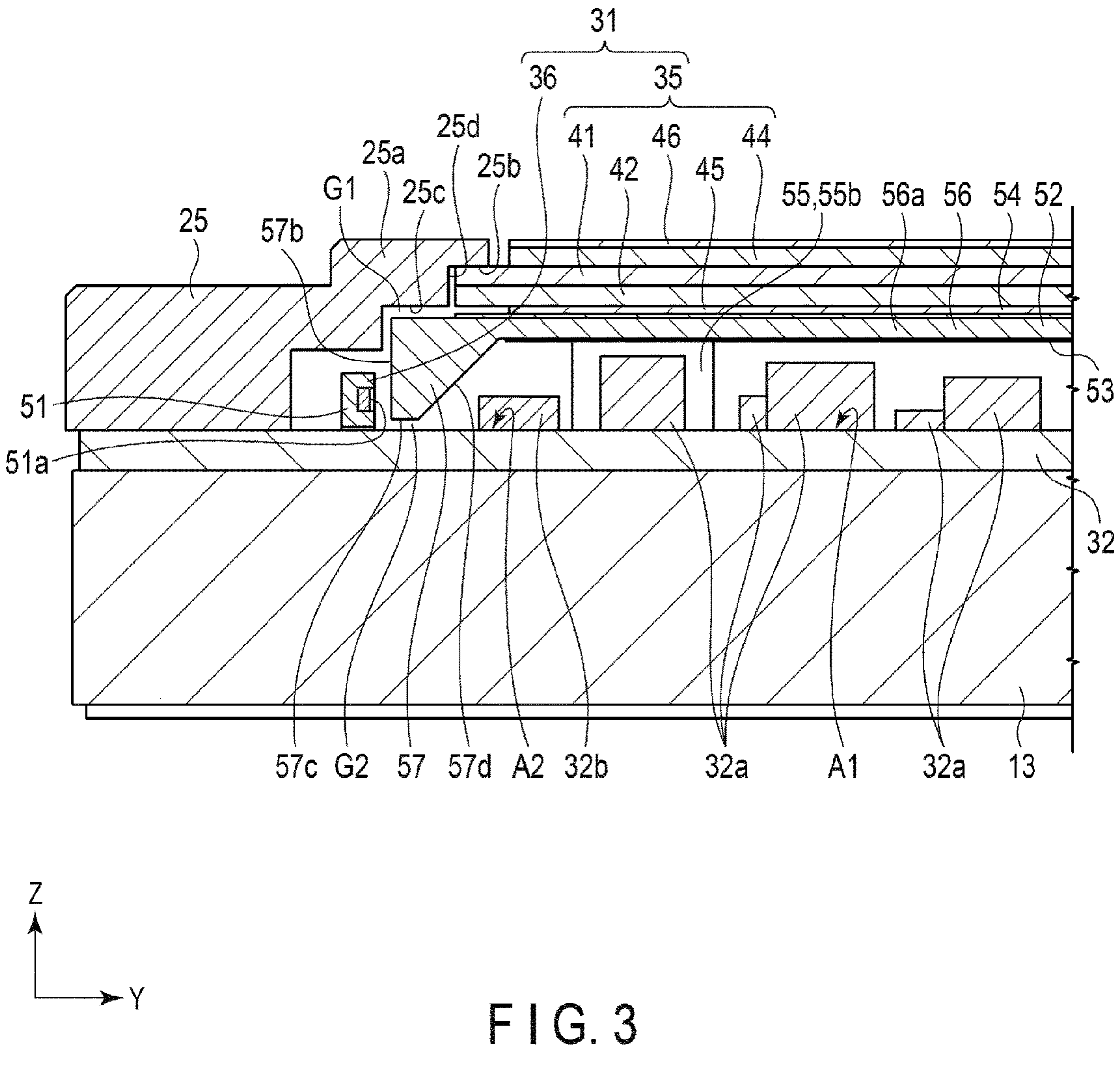
FIG. 3 is a partially enlarged sectional view of the watch.

Hereinafter, a display device 31 and a watch 1 according to a first embodiment of the present invention will be described with reference to FIG. 1 to FIG. 4. FIG. 1 is a sectional view showing some portions of a watch 1 according to the first embodiment. FIG. 2 is a sectional view taken along line A-A of FIG. 1, and FIG. 3 is a partially enlarged sectional view. FIG. 4 is a plan view of a circuit board. The present embodiment describes an example case in which the display device 31 is applied to a dial plate of the watch 1. In the drawings, X, Y, and Z respectively indicate three directions that are perpendicular to each other. The description will assume that the X axis is a horizontal direction connecting 3 o'clock and 9 o'clock of the watch 1, the Y axis is a vertical direction connecting 12 o'clock and 6 o'clock of the watch 1, and the Z axis is a front and back direction (first direction) of the watch 1. For the sake of explanation, FIG. 4 illustrates a visible region R1 serving as a first region using diagonal hatching in one direction, a cover region R2 serving as a second region using diagonal hatching in two directions that intersect with each other, and an end region R3 serving as a third region using diagonal hatching with different widths.

The watch 1 shown in FIG. 1 and FIG. 2 is, for example, a wristwatch, and includes a watch case 12 forming an outer shell, a watch module 13 provided inside the watch case 12, and a cover 14 covering a front side of the watch module 13. The watch 1 also includes a watch band 16 connected to two locations on the outer periphery portion of the watch case 12 and a plurality of switches arranged on the outer periphery of the watch case 12.

Conventionally, as a display device, there exists a display device in which a display portion, a diffusion plate, and a light guide plate are stacked in order, and are arranged to face a circuit board on which various electronic components are mounted.

However, such a display device has a problem wherein a display portion or a light guide plate may come off due to an impact, etc., thereby affecting electronic components.

The following will describe a display device and a watch which aim to improve such a situation and in which a display portion and a light guide plate can be stably fixed.

The watch case 12 includes a housing 21 disposed around the outer periphery portion of the watch module 13, a back cover 22 arranged on the back side of the watch module 13, and an exterior case 23. The watch case 12 forms, by means of the housing 21 and the back cover 22, a container portion **12*a* in which the watch module 13 is arranged. An opening on the front side of the housing 21 is covered with the cover 14. In the present embodiment, the watch case 12** is formed into an octagonal shape.

The housing 21 includes band attachment portions **21*a* at two locations facing each other on the outer periphery portion, for example at the 6 o'clock and 12 o'clock positions, respectively, and the watch band 16 is attached to each of the band attachment portions 21*a***.

The housing 21 is made of metal or resin material. The housing 21 is formed into, e.g., an octagonal frame shape corresponding to the shape of the watch case 12. In the housing 21, the container portion **12*a* that contains therein the watch module 13, etc., is formed. The housing 21 may be configured by combining a plurality of case members. For example, the housing 21 in the present embodiment is configured by assembling a main case member 24 and an inner case member 25 provided on the inner peripheral edge of the main case member 24**.

The main case member 24 is formed into, e.g., an octagonal annular shape corresponding to the shape of the watch case 12. The main case member 24 covers the outer periphery portion of the watch module 13 and the inner case member 25. A groove **24*a* is formed in the edge of the back-surface side of the main case member 24. A waterproof ring that makes a gap between the groove 24*a* and the back cover 22 airtight is attached to the groove 24*a***.

For example, the inner case member 25 is provided at the inner peripheral edge of the main case member 24 and supports a circuit board 32 and a display device 31 that correspond to some portions of the watch module 13. The inner case member 25 is formed into a shape corresponding to the shape of the watch case 12, for example, an octagonal frame shape.

As shown in FIG. 3, for example, the inner case member 25 has a support wall portion **25*a* that supports the display device. The support wall portion 25***a* has a plurality of steps corresponding to the arrangement of the components. For example, the support wall portion 25*a* is provided on at least a portion of the inner peripheral edge of the inner case member 25, and has a first surface 25*b* facing a front side of a peripheral edge of an LCD 35 (display portion), a second surface 25*c* facing a front side of a peripheral edge of a light guide plate, and a connecting surface 25*d* that continuously connects the first surface 25*b* and the second surface 25*c*.

The first surface 25*b* is a plane that is perpendicular to the first direction, which is the thickness direction of the display device 31 and the watch 1, and faces the back-surface side. The first surface 25*b* is arranged to face the front surface side of the peripheral edge of the LCD 35, is in contact with the peripheral edge of the LCD 35, and presses the LCD 35 toward the back side. In the present embodiment, the first surface 25*b* is arranged to face the outer peripheral edge of the electrode board 41 at the front side, which constitutes the LCD 35.

The second surface 25*c* is a plane that is perpendicular to the first direction, which is the thickness direction of the display device 31 and the watch 1, and faces the back-surface side. The second surface 25*c* is arranged to face a front side of a peripheral edge of a light guide plate 52. The second surface 25*c* faces the surface of the peripheral edge of the light guide plate 52 with a gap G1 therebetween. The second surface 25*c* is located closer to the back side which is the other side of the first direction than the first surface 25*b*. Herein, the distance in the first direction between the second surface 25*c* and the first surface 25*b*, that is, the height in the first direction of the connecting surface 25*d*, which is a step, is approximately equal to the thickness dimensions of the electrode boards 41 and 42 of the LCD 35.

The connecting surface 25*d* is an inner wall surface that stands upright in the first direction and connects the first surface 25*b* and the second surface 25*c*, and is disposed to face the outer peripheral surfaces of the electrode boards 41 and 42.

The exterior case 23 is formed into, for example, an octagonal frame shape corresponding to the shape of the watch case 12, and is provided on the front side of the outer periphery of the housing 21. The exterior case 23 is fixed to the housing 21 by means of a connection member such as a screw.

As shown in FIGS. 2 and 3, the watch module 13 includes the display device 31 that displays various types of information such as time, the circuit board 32 (component unit) on which various electronic components 32*a* and 32*b* such as an IC and an antenna serving as a drive portion configured to operate the display device 31 are mounted, and spacers 55*a* and 55*b* arranged between the circuit board 32 and the display device 31. The watch module 13 further includes a battery, a solar board, various sensor components, and various other components necessary for the watch function. In the present embodiment, each of the display device 31 and the circuit board 32 arranged in a stacked manner is formed into an octagonal shape corresponding to the shape of the watch case 12, for example.

For example, the display device 31 includes an LCD 35 (liquid crystal display panel) of a transmissive type and a lighting device 36. For example, the display device 31 is a digital display unit and includes a digital display function.

The LCD 35 includes a pair of a first transparent electrode board 41 and a second transparent electrode board 42 that are stacked with the liquid crystal material layer interposed therebetween, and a pair of a first polarizing plate 44 and a second polarizing plate 45 that are respectively stacked on the front surface of the first electrode board 41 and the back surface of the second electrode board 42 forming the pair with the first electrode board 41, and an optical sheet 46. The LCD 35 is disposed on the opposite side of the circuit board 32 of the light guide plate 52 in such a manner as to face the light guide plate 52.

The transparent electrode boards 41 and 42 forming a pair have transparent electrodes arranged in a matrix on their facing surfaces. An overlapping portion of the transparent electrodes of the electrode boards 41 and 42 forming a pair constitutes a pixel, so that pixels arranged in a matrix are formed. For example, the LCD 35 is electrically connected to the circuit board 32 and is given a drive signal from the circuit board 32 to display information electro-optically. That is, the LCD 35 displays information such as characters and patterns by pixels arranged in a matrix being selectively shielded from light by selective application of a voltage to the transparent electrodes of the electrode boards 41 and 42. Furthermore, the LCD 35 has its outer periphery portion provided with a decorative panel 47 (a panel), its center portion provided with the visible region R1 configured to allow display information to be visible from the front side, and its outer periphery provided with the cover region R2. The visible region R1 is formed into, for example, a rectangular shape.

The polarizing plate 45 on the back side, which is the back surface of the LCD 35, is placed in close contact with a front surface of a diffusion plate 54 of the lighting device 36 in such a manner as to face the diffusion plate 54.

The electrode board 41 on the front side of the LCD 35 is arranged to face the back side of the first surface 25*b* of the inner case member 25 at the periphery, and is supported by the first surface 25*b*. On the other hand, the first polarizing plate 44 and an optical sheet 46 on the front side are arranged on the inner circumferential side of the support wall portion 25*a* of the inner case member 25.

The lighting device 36 is provided on the back side of the LCD 35 and emits light from the back side of the LCD 35. The lighting device 36 includes a light emitting body 51, the light guide plate 52, a reflection plate 53, and the diffusion plate 54.

The light emitting body 51 is provided on the outer peripheral side of the light guide plate 52 on the circuit board 32. Specifically, the light emitting body 51 is arranged to face one side of the light guide plate 52. As in the example shown in FIG. 4, the light emitting bodies 51 are respectively arranged at two locations in the region on the 6 o'clock side, for example, the vicinities of the 5 o'clock and 7 o'clock positions. Each of the light emitting bodies 51 is, for example, a light emitting diode (LED) element, and emits light in the visible light range, such as white light. The light emitting body 51 is electrically connected to the circuit board 32.

The light emitting body 51 has a light source 51*a* that emits light toward the end surface of the light guide plate 52. The light source 51*a* is arranged at the center of the facing surface of the light emitting body 51, which faces the light guide plate 52. For example, in the present embodiment, the light source 51*a* emits light from the end on the 6 o'clock side toward the 12 o'clock side.

The light guide plate 52 is made of a transparent or semi-transparent light transmitting material and is formed into a plate shape. For example, the light guide plate 52 integrally includes a plate portion 56 formed into a flat plate shape and a convex portion 57 protruding toward the back side at an end of the plate portion 56. For example, the light guide plate 52 is smaller than the outer shape of the circuit board 32 and faces the mounting area at the center of the circuit board 32. Furthermore, the light guide plate 52 is larger than the outer shape of the LCD 35. The light guide plate 52 is formed into, for example, an octagonal outer shape. The light guide plate 52 is provided with a predetermined light guide pattern that guides light from the light emitting body 51 in such a manner as to uniformly emit the light from the surface on the front side. The light guide pattern is formed to be denser from one side to the other side in such a manner that its part close to the light emitting body 51 is coarse and its part far from the light emitting body 51 is dense, and is configured in such a manner as to emit an incident light from the upper surface (surface). For example, the light guide pattern may be formed only on a thin portion 56*a* of the light guide plate 52, excluding the convex portion 57, or may be formed in a region of the plate portion 56, including the convex portion 57.

The convex portion 57 is provided at the end of the plate portion 56 on the light emitting body 51 side. The convex portion 57 is a thick protrusion constituted by the end portion of the plate portion 56 protruding toward the back side. The convex portion 57 is configured in such a manner that its thickness dimension in the first direction is set to a predetermined thickness greater than the thickness dimension of the thin portion 56*a* at the center of the plate portion 56.

In the present embodiment, as in one example shown in FIG. 4, the convex portions 57 are respectively provided at the 5 o'clock and 7 o'clock positions of the watch 1. In each of the convex portions 57, a region extending in the horizontal direction protrudes toward the back-surface side. For example, the convex portion 57 is arranged in the cover region R2 that is located outside the central visible region R1 allowing display information to be visible as viewed from the front side of the watch, is covered with the decorative panel 47 shown in FIG. 2, and is not visible from the front side.

As shown in FIG. 3, the convex portion 57 of the light guide plate 52 includes a side surface portion 57*b* facing the light emitting body 51, a back-end surface portion 57*c* facing the circuit board, and a slope portion 57*d*, and is configured in such a manner that the cross-section as seen in the horizontal direction connecting the 3 o'clock point and the 9 o'clock point forms a substantially trapezoidal shape.

The side surface portion 57*b* of the convex portion 57 of the light guide plate 52 faces the light emitting body 51. The side surface portion 57*b* forms an incident surface where light enters. The side surface portion 57*b* is provided at a position facing the light source 51*a* in the vertical direction, which is the incident direction extending from the 6 o'clock side to the 12 o'clock side.

The back-end surface portion 57*c* of the convex portion 57 of the light guide plate 52 is formed into, for example, a flat plate shape. The back-end surface portion 57*c* is provided at a position closer to the back side than the light source 51*a*, and is arranged on the circuit board 32 with a predetermined gap G2 therebetween in such a manner as to face the circuit board 32. The back-end surface portion 57*c* is arranged at a position closer to the circuit board 32 (the back side of the watch 1) than the light source 51*a* of the light emitting body 51 in the first direction.

The slope portion 57*d* of the convex portion 57 of the light guide plate 52 is an inclined surface that is inclined from the inner end of the back-end surface portion 57*c* toward the center. The slope portion 57*d* is constituted by the surface of the back side of the plate portion 56 extending obliquely toward the circuit board 32, and forms a surface inclined with respect to the first direction and a surface direction perpendicular to the first direction. The slope portion 57*d* is arranged to face the circuit board 32 in the first direction.

The reflection plate 53 is provided on the back side of the light guide plate 52 and is formed into a flat plate shape. The reflection plate 53 reflects the light leaking from the plate portion 56 toward the light guide plate 52 and guides it to the light guide plate 52 again.

The diffusion plate 54 is a light-transmitting plate that is arranged between the light guide plate 52 and the LCD 35 and has light transmissivity. The diffusion plate 54 is arranged in such a manner that its front surface is in close contact with the back surface of the LCD 35 and its back surface is in close contact with the surface of the light guide plate 52. The diffusion plate 54 diffuses light from the light guide plate 52 and uniformly emits the light from the upper surface. By the diffusion plate 54 being interposed between the light guide plate 52 and the LCD 35 in the first direction, which is the facing direction, the gap G1 corresponding to the thickness of the diffusion plate 54 and the second polarizing plate 45 is created between the second surface 25*c* and the surface of the peripheral edge of the light guide plate 52.

The circuit board 32 is a board provided with a predetermined wiring pattern and having the plurality of electronic components 32*a* and 32*b* mounted on its surface. The circuit board 32 is arranged to face the back-surface side of the light guide plate 52. In FIG. 4, the LCD 35 arranged to be stacked on the circuit board 32 is indicated by a broken line, and the light guide plate 52 is indicated by a chain line.

The plurality of spacers 55*a* and 55*b* are provided between the circuit board 32 and the reflection plate 53 of the lighting device 36, and regulate the distance between the light guide plate 52 and the circuit board 32 in the first direction. The plurality of spacer 55 are made of a cushioning member such as urethane formed into, for example, a rectangular block shape. As shown in FIG. 4, for example, the plurality of spacers 55 are provided outside the visible region R1 on the circuit board 32.

As shown in FIG. 3, for example, the dimensions of the spacers 55*a* and 55*b* in the first direction are set to a height that allows compression of the light guide plate 52 to be suppressed by forming the gap G2 between the back-end surface portion 57*c* of the convex portion 57 of the light guide plate 52 and the surface of the circuit board 32.

The spacers 55 are attached to predetermined locations on the outer periphery site of the circuit board 32. For example, as shown in FIG. 4, in the present embodiment, the spacers 55 are provided at a total of four locations on both sides in two directions, the vertical direction and the horizontal direction, that is, at positions corresponding to the 12 o'clock, 3 o'clock, 6 o'clock, and 9 o'clock of an analog watch. As an example, the present embodiment includes two types spacers including the first spacers 55*a* and the second spacers 55*b* that are different in size. For example, the large first spacers 55*a* are respectively arranged at 3 o'clock and 9 o'clock positions on both sides in the horizontal direction. Small second spacers 55*b* are respectively provided at 6 o'clock and 12 o'clock positions on both sides in the vertical direction. For example, in the present embodiment, a terminal for connecting a connector is arranged at the 12 o'clock position on one side in the vertical direction, and each of the spacers 55 is arranged at a position closer to the center than this terminal.

FIG. 4 contains, in plan view of the watch 1, the visible region R1 serving as the first region, the cover region R2 serving as the second region, and the end region R3 serving as the third region.

The visible region R1 serving as the first region and the cover region R2 serving as the second region are located in a region which overlaps at least one of the LCD 35 and the light guide plate 52 in plan view. The cover region R2 serving as the second region is located on the outer peripheral side of the visible region R1 serving as the first region. The tallest one of the electronic components arranged in the visible region is smaller in height than the tallest one of the electronic components arranged in the cover region R2 serving as the second region. Therefore, even in the case where deflection occurs in the circuit board 32 due to, e.g., impact, since the tallest electronic component 32*a* located on the central side (the visible region R1) is smaller in height than the tallest electronic component 32*b* located on the outer peripheral side (the cover region R2), contact with the lower surface of the light guide plate 52 (the reflection plate 53) can be suppressed.

The end region R3 serving as the third region is located on the 6 o'clock side on the outer peripheral side of the cover region R2 serving as the second region. Furthermore, the end region R3 serving as the third region is located in a region which does not overlap the LCD 35 or the light guide plate 52 in plan view. The lower surface of the housing 21 in a position overlapping the end region R3 as the third region in plan view is positioned higher than the lower surface of the LCD 35.

Therefore, even in the case where deflection occurs in the circuit board 32 due to impact, etc., since the tallest electronic component 32*a* located in the cover region R2 is smaller in height than the tallest electronic component 32*b* located in the end region R3, contact with the lower surface of the light guide plate 52 (the reflection plate 53) can be suppressed.

The cover 14 is a transparent member made of, for example, inorganic glass such as SiO2 glass. For example, the cover 14 is a transparent watch glass formed into an octagonal shape, and is placed on the front side of the watch module 13 to cover the watch module 13. For example, the cover 14 is supported on the inner peripheral edge of the opening on the front side of the housing 21. A packing is interposed between the outer periphery of the cover 14 and the inner periphery edge of the housing 21.

The watch band 16 includes a coupling mechanism such as a pair of band members or buckles, which are respectively connected to two facing locations on the outer periphery of the watch case 12.

The switch is provided on, for example, the outer periphery portion of the case, and performs mode changing, time adjustment, etc., of the watch module 13 in response to an operator's pressing operation.

In a process of assembling the display device 31, for example, the LCD 35 is set from the back side of the container portion 12*a* of the housing 21, and the diffusion plate 54, the light guide plate 52, and the reflection plate 53 are further installed on the back side of the LCD 35 in close contact with each other. At this time, the outer periphery portion of the electrode board 41 on the front side of the LCD 35 is arranged to face the first surface 25*b* of the housing 21 and is supported thereby. The first polarizing plate 44 and an optical sheet 46 are located closer to the inner peripheral side than the support wall portion 25*a* and are arranged on the front side of the first surface 25*b*. The circuit board 32 on which the electronic components 32*a* and 32*b* are mounted and to which the spacer 55 is attached in advance is assembled into the lighting device 36. At this time, the reflection plate 53, the light guide plate 52, the diffusion plate 54, and the LCD 35 are pushed up to the front side by the spacer 55*a*.

With the display device 31 according to the present embodiment, the LCD 35 and the light guide plate 52 can be stably fixed by means of the spacers 55*a* and 55*b*. Furthermore, by the spacers 55*a* and 55*b* pushing the light guide plate 52 upward to thereby regulate the dimension in the first direction, a close contact state between the light guide plate 52 and the LCD 35 can be easily made uniform.

In the LCD 35, the optical sheet 46, the first polarizing plate 44, the first electrode board 41, the second electrode board 42, and the second polarizing plate 45 are arranged in this order. At this time, the upper surface of the first electrode board 41 of the LCD 35 pushes the first surface 25*b* of the support wall portion 25*a* of the inner case member 25 upward while being in contact therewith. That is, the surface of the first electrode board 41 is arranged in contact with the first surface 25*b* serving as the lower surface of the support wall portion 25*a* (the support portion) of the housing 21. Therefore, the optical sheet 46 and the first polarizing plate 44 are arranged in a position which does not protrude from the upper surface of the support wall portion 25*a* of the inner case member 25, and are approximately equal in thickness to the front end of the support wall portion 25*a* of the inner case member 25. Thus, the display device 31 can be made thinner by the thickness of the optical sheet 46 and the first polarizing plate 44 as compared to the case in which the whole of the upper surface of the LCD 35 is pushed against the inner case member 25.

Furthermore, by providing the diffusion plate 54 in a gap between the light guide plate 52 and the LCD 35 to thereby bring the front surface of the light guide plate 52 and the back surface of the LCD 35 into close contact with the diffusion plate 54, a situation in which a close contact portion and a non-contact portion are partially generated and affect the outer appearance can be prevented.

Figure 5:
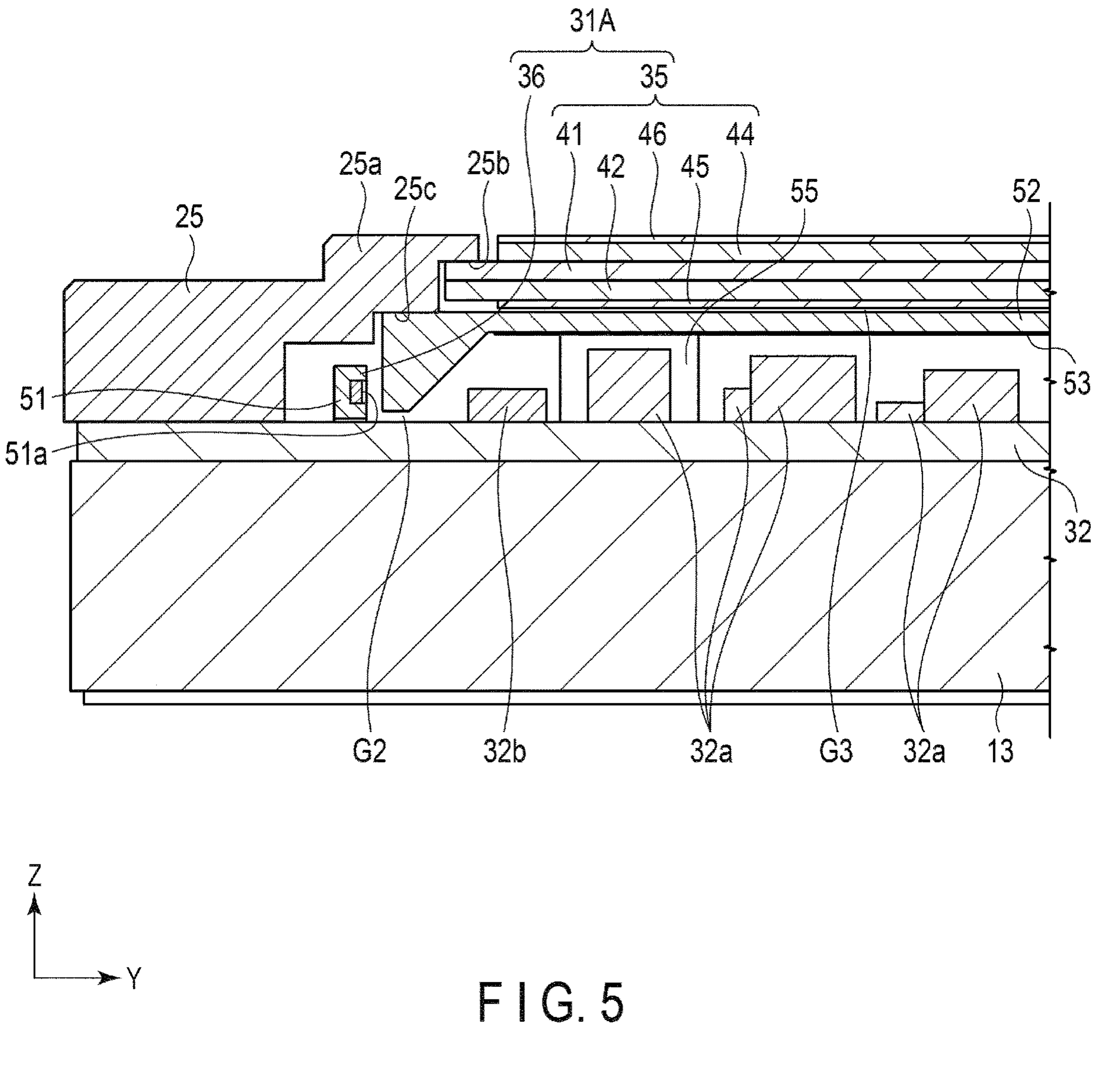
FIG. 5 is a partially enlarged sectional view of an existing watch.

FIG. 5 is a partially enlarged sectional view of an existing watch as a comparative example. As shown in FIG. 5, a display device 31A according to the comparative example includes the inner case member 25 having the support wall portion 25*a* (the support portion) supporting the display device 31A. In the inner case member 25, the support wall portion 25*a* has a plurality of steps. In the LCD 35 (the display portion), the optical sheet 46, the first polarizing plate 44, the first electrode board 41, the second electrode board 42, and the second polarizing plate 45 are arranged in this order. At this time, the upper surface of the first electrode board 41 of the LCD 35 is in contact with the first surface 25*b* of the support wall portion 25*a*.

Thereafter, in the display device 31A, the circuit board 32 on which the electronic components 32*a* and 32*b* are mounted and to which the spacer 55 is attached in advance is assembled into the lighting device 36. At this time, the light guide plate 52 is pushed against the second surface 25*c* of the inner case member 25 by the spacer 55*a*.

At this time, a gap occurs in a gap G3 between the LCD 35 (the display portion) and the light guide plate 52. With the configuration described above, under the presence of the gap G3 between the LCD 35 (the display portion) and the light guide plate 52, if the LCD 35 and the light guide plate 52 are partially in close contact with each other and are partially not in close contact, a problem arises in the appearance of the LCD 35 (the display portion), thereby leading to a visibility problem.

On the other hand, with the display device 31 according to the first embodiment, by providing the diffusion plate 54 in a gap between the light guide plate 52 and the LCD 35 to thereby bring the front surface of the light guide plate 52 and the back surface of the LCD 35 into close contact with the diffusion plate 54, the outer appearance can be prevented from being affected by a close contact portion and a non-contact portion being partially generated. Furthermore, with the display device 31 according to the first embodiment, light from the light emitting body 51 can be uniformly diffused by the diffusion plate 54, so that uniformity and luminance can be improved. Thus, by bringing the LCD 35 and the light guide plate 52 into close contact with each other without affecting conditions such as a type, a thickness, etc., of the polarizing plate, etc., an appearance defect can be avoided. Furthermore, with the spacers 55*a* and 55*b*, the light guide plate 52 and the circuit board 32 can be prevented from warping.

The embodiment is discussed merely as an example, which should not be considered to restrict the scope of invention.

MODIFICATION EXAMPLES

For example, the example described above includes the light emitting body 51 at one end; however, the present invention is not limited to this. For example, the light emitting body 51 may be configured in such a manner that it is arranged in the center or at both end portions of the LCD 35 or the light guide plate 52.

Furthermore, the shapes and positions of the spacers 55*a* and 55*b* are not limited to those in the above embodiment. For example, in the case where the reflection plate 53 has deflection in a predetermined roll direction, the deflection of the reflection plate 53 can be suppressed by providing the spacers 55*a* and 55*b* on at least both sides in the roll direction.

Furthermore, the example described above includes the light emitting body 51 at one end; however, the present invention is not limited to this example. For example, the present embodiment may be configured in such a manner that the light emitting body 51 is arranged in the center or at both end portions of the LCD 35 or the light guide plate 52.

Furthermore, the LCD 35 was described as an example of the display portion; however, the display portion is not limited to this. The display portion may be, for example, an organic EL display.

Although several embodiments of the present invention have been described, the specific configuration, structure, positional relationship, etc. shown in the above embodiments can be changed as appropriate without departing from the spirit of the present invention. The scope of the present invention is included within the scope of the invention described in the claims and their equivalents.

What is claimed is:

1. A display device comprising:

a circuit board on which a plurality of electronic components are arranged;

a light guide plate arranged to face the plurality of electronic components;

a display portion arranged on a side of the light guide plate opposite the circuit board;

a light-transmitting plate having light transmissivity, arranged between the light guide plate and the display portion, and configured to be in contact with a front surface of the light guide plate and a back surface of the display portion;

a housing comprising:

a first surface arranged to face a portion of a front surface of an outer periphery portion of the display portion; and a second surface with a gap interposed between the second surface and a front surface of a peripheral edge of the light guide plate; and a spacer provided on a front surface of the circuit board and configured to regulate a distance between the circuit board and the light guide plate and to push the portion of the front surface of the outer periphery portion of the display portion against the first surface of the housing.

2. The display device according to claim 1, wherein the display portion is an LCD.

3. The display device according to claim 2, wherein the LCD includes a first electrode board, a second electrode board, a first polarizing plate overlapping a front surface of the first electrode board, an optical sheet overlapping a front surface of the first polarizing plate, and a second polarizing plate arranged to overlap a back surface of the second electrode board in a laminated manner.

4. The display device according to claim 3, wherein the optical sheet and the first polarizing plate of the LCD each have an outer peripheral edge arranged inside a support portion of the housing.

5. The display device according to claim 4, wherein the front surface of the first electrode board is arranged in contact with a lower surface of the support portion of the housing.

6. The display device according to claim 2, wherein the LCD includes a panel at the outer periphery portion, and has a visible region formed closer to a center side than the panel.

7. The display device according to claim 6, wherein the spacer is arranged in a region outside of the visible region.

8. A watch comprising: the display device according to claim 1;

a watch case; and a watch module provided inside the watch case.

9. A watch comprising: the display device according to claim 2;

a watch case; and a watch module provided inside the watch case.

10. The display device according to claim 2, wherein only the portion of the front surface of the outer periphery portion of the LCD is pushed against the first surface.

* * * * *